Nov. 27, 1945.  D. J. CONANT  2,389,841
FLUID COUPLING
Filed Oct. 10, 1942  2 Sheets-Sheet 1
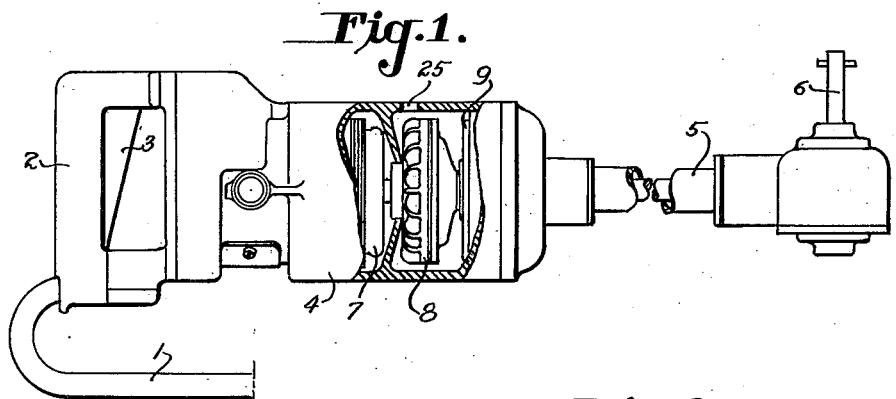
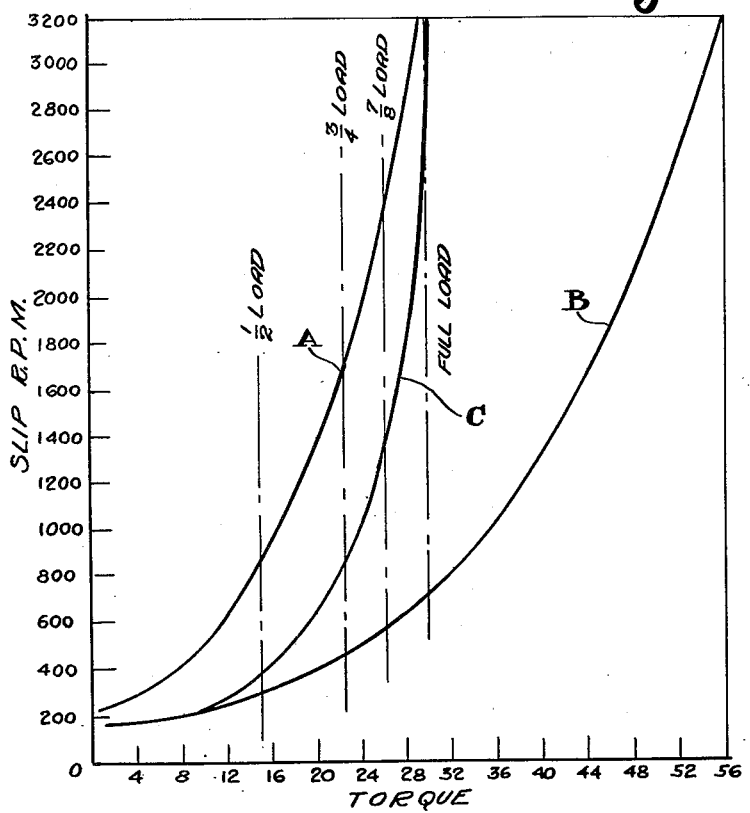
INVENTOR.
DAVID J. CONANT.
BY
Frank H. Harmon
ATTORNEY.

Nov. 27, 1945.　　　D. J. CONANT　　　2,389,841
FLUID COUPLING
Filed Oct. 10, 1942　　　2 Sheets-Sheet 2
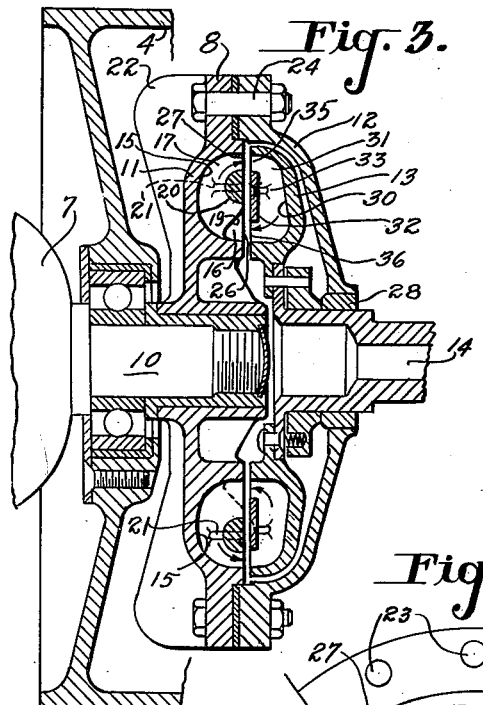
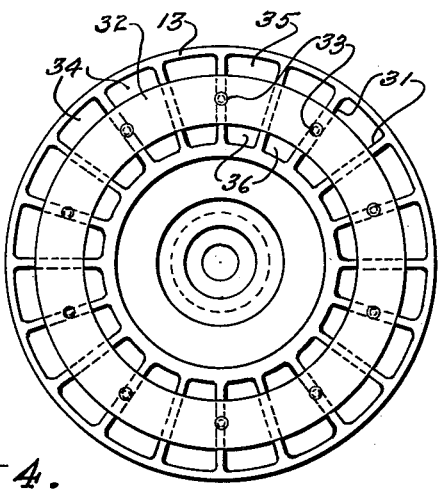
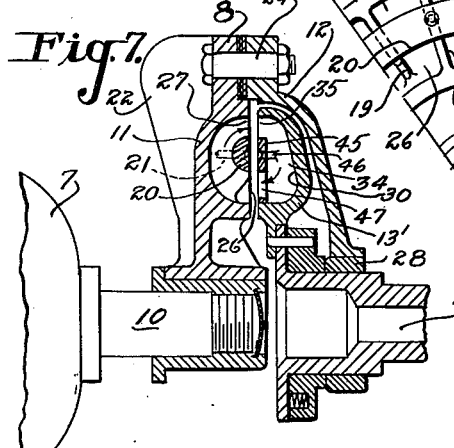
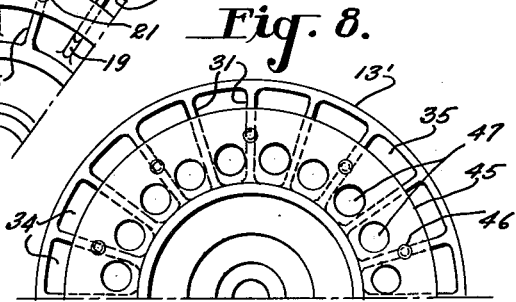
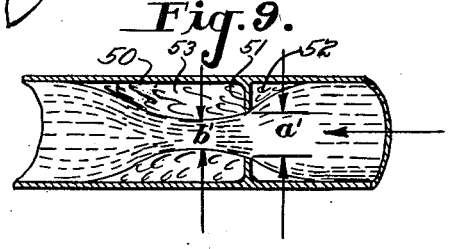
INVENTOR.
DAVID J. CONANT.
BY
Frank H. Harmon
ATTORNEY.

Patented Nov. 27, 1945

2,389,841

UNITED STATES PATENT OFFICE 2,389,841

FLUID COUPLING

David J. Conant, Cleveland Heights, Ohio, assignor to Jack & Heintz, Inc., Bedford, Ohio, a corporation of Ohio Application October 10, 1942, Serial No. 461,561

11 Claims. (Cl. 60—54)

This invention relates to improvements in fluid couplings of the type designed to transmit power from a driving shaft to a driven shaft.

In starting large airplane engines and the like it is customary to utilize the kinetic energy of a small flywheel rotating at an extremely high speed. Preparatory to such a starting operation the flywheel must be accelerated or energized until its speed is sufficient to supply the energy required for starting, which energizing is preferably accomplished by an electric motor. An electric motor drive for this purpose, however, presents unique problems, and conventional driving mechanisms of the types now known and used depart far from the ideal. When the switch is closed the conventional direct-connected motor turns the flywheel very slowly at first, in the initial stages of acceleration, developing substantially no back E. M. F., and receiving a large value of power input, thereby developing heat at a maximum rate while the rate of cooling is a minimum, with the result that dangerous overheating commonly occurs.

A mechanical friction clutch in the motor drive fails to solve the problem because it prevents any slippage whatever in the operating range of torques, slippage occurring only as a safety feature in case of overload. The characteristics of friction clutches do not permit slipping throughout the operating range. Prior art fluid couplings are also unsatisfactory because they have too much slip in the operating range, and not enough slip under overload conditions.

The general object of the present invention is therefore to provide an improved fluid coupling having a relatively small value of slip within its operating range of torque values, and having relatively large values of slip above a critical value of torque. Stated in another way, the slip characteristic plotted against torque should be a flat curve, low on the scale, to the limit of the operating range which constitutes a critical value beyond which the curve should abruptly become and continue steep.

Another object of the invention is to provide a fluid coupling for an energizer of the type described which will permit the motor to rotate sufficiently in the initial stages of flywheel acceleration to prevent excessive overheating, and which will have relatively small slip as the motor accelerates throughout its operating range.

In order to accomplish the above general objects of the invention it is a particular object to abruptly change the nature of the fluid flow within the fluid coupling in response to predetermined values of torque. A more specific object is to provide orifice means within the coupling to automatically control the fluid flow in response to torque.

These and additional objects and advantages will become apparent as the description proceeds in connection with the accompanying drawings in which:

Figure 1 is an elevational view of an energizer with parts broken away to show the fluid coupling of the present invention therein;

Figure 2 shows slip-torque curves of conventional fluid couplings compared with the characteristics obtained from the coupling of the present invention;

Figure 3 is an enlarged longitudinal sectional view through a preferred embodiment of the fluid coupling;

Figure 4 is a partial elevational view of the impeller shown in Figure 3;

Figure 5 is an elevational view of the runner shown in Figure 3;

Figure 6 illustrates diagrammatically the nature of the fluid flow through the orifices 36 in the embodiment of Figures 3 and 5;

Figure 7 is a fragmentary longitudinal sectional view showing another embodiment of the invention;

Figure 8 is a partial elevational view of the runner shown in Figure 7; and

Figure 9 illustrates diagrammatically the nature of the fluid flow through the orifices 47 in the embodiment of Figures 7 and 8.

The principles of the invention are illustrated in two embodiments utilizing orifice means to prevent the normal increase in fluid flow as the fluid pressure difference increases under increasing torque. In power devices such as the energizer shown in Figure 1, a primary function of the clutch or fluid coupling is to serve as an overload release, or torque limiting device. A conventional fluid coupling designed to limit the torque to a predetermined maximum, or full load value, has a slip characteristic as shown by the curve A in Figure 2. Such a coupling, however, has an excessive amount of slip throughout its operating range so that between half and full load values of torque a relatively large proportion of the energy input is dissipated in the coupling as heat, producing a low overall efficiency and low speed rotation of the power output shaft. If a larger fluid coupling is used, to keep the slip small throughout the normal load range, the maximum value of torque far exceeds the permissible full load value, as shown by curve B plotted from the performance of such a coupling, thus failing to perform the primary function of the coupling. Any compromise in sizes of conventional fluid couplings between coupling A and coupling B would likewise be unsatisfactory for the same reason, since the maximum torque values at the upper end of the curve would fall to the right of the full load value, as shown in Figure 2. It is apparent, then, that the characteristics of the conventional fluid coupling are unsuited for the present purpose.

In accomplishing the objects of the present invention the desirable low slip characteristics of curve B are largely retained, but means are provided for causing a relatively abrupt increase in slip at near full load values of torque in order to keep the upper part of the curve from crossing the full load torque line, thereby also obtaining the load limiting feature of coupling A and accomplishing the safety function of the fluid coupling. The means for increasing the slip at large values of torque comprise sharp edge type orifices in the coupling to control the fluid flow. The action of such an orifice is to cause a contraction in the jet issuing therefrom, tending to lessen the rate of increase in flow with increase in pressure difference, which has the result of increasing the slip at full load torque far beyond the slip of the conventional coupling B. Curve C is the characteristic of applicant's improved fluid coupling, illustrating the attainment of the combination of desirable features of couplings A and B without the disadvantages of either.

Figure 1 shows an energizer of the type referred to, having an electrical supply conduit 1, a handle 2, switch 3, housing 4 and extension 5, said extension 5 carrying a stub shaft 6 adapted to fit in the usual socket provided on aircraft for receiving conventional hand cranking mechanism. The housing 4 is broken away to show a driving motor 7, fluid coupling 8, and reduction gearing 9, the motor shaft constituting the driving member of the fluid coupling for rotating an impeller therein to drive a runner on a driven shaft connected with the reduction gearing 9.

An enlarged longitudinal sectional view of the fluid coupling 8 is shown in Figure 3. A driving shaft 10 rotated at high speed by the motor 7 carries an impeller member 11 to which is secured a cover member 12 housing a runner 13 for rotating a driven shaft 14. Figure 4 shows a partial elevational view of the impeller 11, and Figure 5 shows an elevational view of the runner 13. The impeller 11 has an annular cavity 15 intercepted by radial vanes or fins 16 and 17 forming fluid passageways 18. The fins 16 completely bridge the cavity 15, but in order to avoid constriction of the passageways on account of the wall thickness of the fins, the fins 17 are cut away at 19 so as to terminate short of the inner side of the cavity 15. A ring 20 is secured by means 21 to the fins 16, this ring having a cross section as shown in Figure 3, leaving entrance openings 26 and exit openings 27. The securing means 21 comprise pins or projections formed integrally with the fins 16 and passing through countersunk openings in the ring 20 with their outer ends peened down, or riveted, against said ring, the metal of the pin fitting said countersunk portion to leave a smooth surface.

The contours of the cavity 15 and the ring 20 are such as to produce fluid passageways having cross sectional areas varying according to the formula CPR=constant, where C is a constant, and P is the fluid pressure at radius R from the axis of rotation. That is to say that the product of the fluid pressure on each elemental mass of fluid, and its radius of rotation, remain a constant value as the elemental mass moves through the passageway. The impeller member is provided with external fins 22 to cool this member and to draw air through the motor by fan action, the heated air being blown out through openings 25 in hte housing 4. Holes 23 are provided to accommodate securing means 24 for the cover member 12. This cover member may also be provided with external fins if desired, and a fluid seal bearing 28.

The runner member 13 is provided with an annular cavity 30 intercepted by radial vanes or fins 31 so that when a flat ring member 32 is secured by the means 33 in the manner shown a plurality of fluid passageways 34 are formed complementary to the fluid passageways 18 in the impeller. As in the impeller, the means 33 comprise pins cast with the runner vanes and peened over into countersunk holes in the ring 33. Unlike the impeller, the passageways 34 in the runner are shaped to have a constant cross sectional area to produce uniform velocity of flow from the entrance openings 35 to the exit openings 36. The exit openings 36, however, take the form of orifices having cross sectional areas considerably less than the cross sectional areas of the passageways, and, the ring 32 being square-edged and relatively thin, these openings have the characteristics of submerged, sharp edge orifices. Inasmuch as only one side of each exit opening 36 has a sharp edge, the true characteristics of a sharp edge orifice are not exactly duplicated, but they are found in practice to be approximated sufficiently closely to warrant the use of the terminology in describing the structure and performance of the present device.

Figure 6 illustrates diagrammatically the action of the exit openings, or orifices, 36. The numeral 40 represents a pipe filled with fluid flowing in the direction indicated. A thin plate, or baffle, 41 extends into the pipe so as to leave an orifice of width $a$ between the end of the baffle and the wall of the pipe. The change in direction of flow of the fluid trying to get around the baffle results in a contracted, submerged jet having a width $b$ which is less than the width $a$. Turbulence results in the regions 42 and 43 on the upstream and downstream sides of the baffle. When the fluid velocity is small the contraction is slight, and when the velocity is increased the amount of contraction is increased. The action is the same regardless of whether Figure 6 be considered viewed in plan or elevation.

In applicant's fluid coupling let it be assumed that the motor is started, so as to rotate the impeller 11, but that an inertia load prevents rapid acceleration of the runner 13 thereby producing an initial slip R. P. M. approximately equal to the motor speed. The fluid in passageways 18 in the impeller is accordingly subjected to centrifugal forces tending to produce circulation in the direction of the arrows in Figure 3, because of the pressure difference existing at the openings 27, 35 between the rapidly rotating impeller and the relatively stationary runner. In a manner well understood in the art the fluid streams issuing from the impeller openings 27 have axial and tangential velocity components producing a resultant velocity which impinges upon the vanes 31 of the runner so as to impart, or transmit, a torque thereto. These fluid streams enter the openings 35 and flow through the passageways 34 at unform velocity and with a minimum of pipe friction until they reach the exit openings, or orifices 36.

In starting, the fluid velocities in the impeller and runner passageways are a maximum, and the jet contraction is a maximum, automatically controlling the fluid flow so that the delivered torque attains, but cannot exceed, the predetermined full load value regardless of the magnitude of the slip R. P. M. As the runner rotates faster the jet contraction, and consequently the slip R. P. M. become less, as will be seen by following curve C from right to left. By comparing curve C with curve B it is evident that in the left hand portions where the two curves merge together the contraction of the jets at low fluid velocities is so slight that no measurable effect appears in the characteristic. As a corollary it may be said that the divergence of the upper portions of the curves B and C illustrates the effectiveness of jet contraction in preventing the conventional rate of increase of fluid flow with slip, for if the fluid flow were not thus impeded at high velocities the curve C would continue to follow curve B.

In this manner the orifice action of the exit openings 36 may be said to control the fluid flow so as to produce a characteristic of the shape of curve C, thereby accomplishing the objects of the invention. The performance of the coupling in the manner described does not depend upon a critical spacing of the impeller and runner members; this clearance may be varied considerably without noticeably affecting the characteristics of the coupling.

It is seen that the slip is very much less throughout the load range than obtains with conventional fluid coupling A having the same full load rating, and that at low load values curve C merges into curve B which is for a coupling having a far greater full load rating. In actual test data, from which the curves of Figure 2 were plotted, applicant's coupling C operated at seven-eighths load with 970 R. P. M. less slip, at three quarters load with 900 R. P. M. less slip, and at half load with 500 R. P. M. less slip, than conventional coupling A which is the best conventional type coupling known to applicant for the present purpose at the same load rating. This marked reduction in slip represents a corresponding increase in performance and efficiency of the energizer, and cannot be obtained by merely introducing variations in the shape, pipe friction, etc., of conventional couplings. It can only be obtained by introducing a positive automatic control element such as applicant's sharp edge orifices to properly regulate the fluid flow.

Figures 7 and 8 illustrate by way of partial sectional and elevational views a modified construction. The impeller 11 and cover member 12 are the same as shown in Figures 3 and 4, the only change being in the runner member. Corresponding parts are identified by similar reference numerals, the modified runner member being designated by the numeral 13'. The principal casting forming the runner member 13' is identical with the previously described runner member 13, except that the fins, or vanes, 31 are cut down to receive a flat ring 45 extending to the inner margin of the annular cavity 30. The ring 45 is secured to the vanes 31 by means 46 making fluid passageways 34 with entrance openings 35 as in the runner 13. The runner 13' is different from the runner 13 in that the exit openings, or orifices, comprise circular holes 47 in the ring 45. These orifices more closely approximate true submerged sharp edge orifices since they are spaced radially outwardly from the inner margin of ring 45 and passageways 34. Also, if desired, the diameters of holes 47 may be made slightly less than the distance between the vanes 31 so that the margins of the orifices will be spaced on all sides from adjacent walls of the fluid passageways 34. It is then seen that the jets discharged from the circular orifices 47 will be contracted on all sides instead of but one side as in the case of the exit openings 36.

The action of a typical submerged, sharp edge orifice of the type of the orifices 47 is shown diagrammatically in Figure 9. The numeral 50 represents a pipe filled with fluid flowing in the direction indicated. A thin plate, or baffle, 51 having a central orifice of diameter $a'$ extends inwardly of the pipe walls. The changes in direction of flow of the fluid in trying to get through the baffle result in a contracted, submerged jet having a diameter $b'$ which is less than the diameter $a'$. Turbulence results in the regions 52 and 53 on the upstream and downstream sides of the baffle. As in Figure 6, the contraction varies with the fluid velocity, but in Figure 9 the contraction occurs on all sides of the jet substantially equally since the orifice and jet are symmetrical about the center line of the pipe.

In operation, the embodiment of Figure 7 develops a slip-torque characteristic the same as curve C in Figure 2, for all practical purposes, the variance from curve C being small enough to be disregarded in a small coupling. In both embodiments the orifice openings in the runner control the fluid flow to limit the transmitted torque at the full load value, allowing practically unlimited slip to take place at full load between the impeller and runner, whereby the motor may turn fast enough to produce a considerable back E. M. F., and to move cooling air through the housing. At less than full load the orifice openings have less effect upon the performance, so that the low slip characteristics of a coupling of higher load rating are obtained, the effect then being more nearly that of a direct drive through a rigid coupling.

The size of the orifice openings in relation to the cross sectional areas of the runner passageways may be varied considerably to produce a desired performance characteristic. In the preferred embodiment shown in Figures 3, 4 and 5 the area of each exit opening 36 is 0.575, or slightly more than half, the cross sectional area of each passageway 34. In the embodiment shown in Figures 7 and 8 the area of each circular orifice 47 is 0.819, or slightly more than four-fifths, the cross sectional area of each passageway 34, it being remembered that substantially identical slip-torque characteristics are obtained from the two couplings on test. The use of a larger orifice in Figures 7 and 8 may be explained by the fact that contraction of the jet occurs substantially equally on all sides, producing a greater control effect than when contraction can occur on only one side. Applicant does not limit his invention to specific types, sizes, or ratios of orifice openings because the amount of the control effect is also influenced by other factors such as the operating range of torque, speed, slip, fluid velocities, etc., which determine the operating portion of the curve.

While it is at present preferred to have the orifices located at the discharge or exit openings in the runner, it is to be understood that the invention is not to be so limited. The orifices may be disposed elsewhere in the fluid passages of the runner so long as cavitation is avoided, the important consideration being that they accomplish their function of exerting an automatic control effect on the fluid flow which transmits torque from the impeller to the runner. In describing the fluid flow it is assumed that the coupling is completely filled with a liquid such as a suitable oil, but other fluids may be used, and it is not necessary to the present invention that the coupling as a whole be completely filled, provided that there is sufficient fluid to completely fill all the fluid passageways in the impeller and runner.

Other changes and modifications will occur to those skilled in the art, and it is to be understood that all such variations are included in the invention, the same being limited only by the scope of the appended claims.

I claim:

1. In a fluid coupling, a runner having fluid passageways, a ring forming one side of said passageways, and openings in said ring forming sharp edge orifices in said passageways.

2. In a fluid coupling, a runner having curved fluid passageways therein of substantially uniform cross sectional area, a flat member forming one side of said passageways, one edge of said member forming a sharp edge portion of cavitation-free discharge orifices having areas approximately half the cross sectional areas of said passageways.

3. In a fluid coupling, a runner having curved fluid passageways therein of substantially uniform cross sectional area, a flat member forming one side of said passageways, and openings in said member forming cavitation-free sharp edge discharge orifices having areas approximately four-fifths the cross sectional areas of said passageways.

4. In a fluid coupling, in combination with an impeller having passageways whose cross sectional areas vary so that the products of the fluid pressures and the radii of rotation are constant throughout the lengths of said passageways, a runner having fluid passageways whose cross sectional areas are substantially constant, and sharp edge orifices in said runner passageways, the areas of said orifice openings being less than the cross sectional areas of said passageways.

5. A fluid coupling comprising an impeller having an annular cavity with radial fins therein, a ring partly covering said fins to form open ended, curved passageways therebetween, each passageway having a cross sectional area varying so that the product of fluid pressure and radius of rotation is a constant; a runner having an annular cavity with radial fins therein, a ring partly covering said fins to form open ended, curved passageways therebetween, said passageways having substantially uniform cross sectional areas up to the inner ends thereof, said ring forming an orifice of the sharp edge type at the inner end of each of said last-mentioned passageways.

6. A fluid coupling comprising an impeller having an annular cavity with radial fins therein, a ring partly covering said fins to form open ended, curved passageways therebetween; a runner having an annular cavity with radial fins therein, a ring partly covering said fins to form open ended, curved passageways therebetween said runner passageways having substantially uniform cross sectional areas up to the inner ends thereof, said last mentioned ring covering a greater area than said impeller ring and forming orifices of the sharp edge type at said inner ends of said runner passageways.

7. A fluid coupling comprising an impeller having an annular cavity with radial fins therein, a ring partly covering said fins to form open ended, curved passageways therebetween; a runner having an annular cavity with radial fins therein, a ring partly covering said fins to form open ended, curved passageways therebetween, said runner passageways having substantially uniform cross sectional areas up to the inner ends thereof, said last mentioned ring having an outer diameter substantially equal to the outer diameter of said impeller ring and an inner diameter substantially less than the inner diameter of said impeller ring and forming orifices of the sharp edge type at said inner ends of said runner passageways.

8. A fluid coupling comprising an impeller having an annular cavity with radial fins therein, a ring partly covering said fins to form open ended, curved passageways therebetween; a runner having an annular cavity with radial fins therein, a ring partly covering said fins to form open ended, curved passageways therebetween, said runner passageways having substantially uniform cross sectional areas up to the inner ends thereof, said last mentioned ring having an outer diameter substantially equal to the outer diameter of said impeller ring and an inner diameter substantially less than the inner diameter of said impeller ring, the inner edge of said runner ring forming sharp edge orifice portions on the radially outer sides of said inner ends of said runner passageways.

9. In a fluid coupling having an impeller with an annular cavity with radial fins therein and an annular ring having a radial surface partly covering said fins to form open ended, curved passageways therebetween, a runner having an annular cavity with radial fins therein, and a ring having a radial surface partly covering said fins to form open ended, curved passageways therebetween, said runner passageways having substantially uniform cross sectional areas up to the inner ends thereof, said last-mentioned ring covering a greater radial surface area than said impeller ring and forming orifices of the sharp edge type at said inner ends of said runner passageways.

10. In a fluid coupling having an impeller with an annular cavity with radial fins therein and an annular ring partly covering said fins to form open ended, curved passageways therebetween; a runner having an annular cavity with radial fins therein, and a ring partly covering said fins to form open ended, curved passageways therebetween, said runner passageways having substantially uniform cross sectional areas up to the inner ends thereof, said ring having an outer diameter substantially equal to the outer diameter of said impeller ring and an inner diameter substantially less than the inner diameter of said impeller ring, the inner edge of said runner ring forming sharp edge orifice portions on the radially outer sides of the radially inner ends of said runner passageways, the radially inner sides of the inner ends of said runner passageways being smooth and unobstructed.

11. In a fluid coupling having an impeller with an annular cavity with radial fins therein and an annular ring having a radial surface partly covering said fins to form open ended, curved passageways therebetween; a runner having an annular cavity with radial fins therein, and a ring having a radial surface partly covering said fins to form open ended, curved passageways therebetween, said runner passageways having substantially uniform cross sectional areas up to the inner ends thereof, said runner ring having an outer diameter substantially equal to the outer diameter of said impeller ring, and covering a greater radial surface area than said impeller ring.

DAVID J. CONANT.